United States Patent [19]
Udagawa et al.

[11] Patent Number: 5,382,029
[45] Date of Patent: Jan. 17, 1995

[54] METAL LAMINATE GASKET WITH DEFORMATION PREVENTING MECHANISM

[75] Inventors: Tsunekazu Udagawa, Ichikawa; Yoshio Yamada, Tokyo, both of Japan

[73] Assignee: Ishikawa Gasket Co., Ltd., Tokyo, Japan

[21] Appl. No.: 19,199

[22] Filed: Feb. 17, 1993

[30] Foreign Application Priority Data

Feb. 26, 1992 [JP] Japan ............................. 4-008769[U]
Feb. 26, 1992 [JP] Japan ............................. 4-008773[U]

[51] Int. Cl.⁶ ............................................. F16J 15/08
[52] U.S. Cl. ............................................. 277/235 B
[58] Field of Search .................... 277/234, 235 B, 236

[56] References Cited

U.S. PATENT DOCUMENTS

| | | |
|---|---|---|
| 1,814,283 | 7/1931 | Braner .................. 277/235 B X |
| 2,034,610 | 3/1936 | Dickson . |
| 2,089,254 | 8/1937 | Fitzgerald . |
| 2,737,405 | 3/1956 | Shinn ...................... 277/235 B |
| 4,714,260 | 12/1987 | Udagawa . |
| 4,759,556 | 7/1988 | Udagawa ............... 277/235 B |
| 4,859,516 | 9/1989 | Udagawa et al. . |
| 5,082,298 | 1/1992 | Uchida et al. . |

FOREIGN PATENT DOCUMENTS

| | | | |
|---|---|---|---|
| 580795 | 8/1959 | Canada ........................ 277/235 B |
| 190736 | 11/1982 | Japan ........................... 277/235 B |
| 190737 | 11/1982 | Japan ........................... 277/235 B |
| 190738 | 11/1982 | Japan ........................... 277/235 B |
| 177363 | 8/1987 | Japan ........................... 277/235 B |

Primary Examiner—William A. Cuchlinski, Jr.
Assistant Examiner—Scott W. Cummings
Attorney, Agent, or Firm—Kanesaka & Takeuchi

[57] ABSTRACT

A metal laminate gasket of the invention is installed in an internal combustion engine having a hole near an outer profile. The hole has a width along the outer profile, and the width of the hole is greater than a distance between the hole and the outer profile. The gasket is formed of a plurality of metal plates to constitute a metal laminate gasket. Each metal plate includes a side edge extending at least along the outer profile of the engine, a gasket hole having a size substantially equal to that of the hole of the engine, and an elongated portion located between the side edge and the gasket hole. The metal plates are immovably fixed together at the elongated portions to prevent the elongated portions from deforming outwardly of the engine.

10 Claims, 2 Drawing Sheets

METAL LAMINATE GASKET WITH DEFORMATION PREVENTING MECHANISM

BACKGROUND OF THE INVENTION AND RELATED ART STATEMENT

The present invention relates to a metal laminate gasket having a deformation preventing mechanism, more particularly, a metal laminate gasket having a mechanism to prevent deformation of an elongated portion formed between a gasket edge portion and a hole.

A metal laminate gasket has been widely used to seal between engine parts, such as a cylinder head gasket and a manifold gasket. The metal laminate gasket is formed of a plurality of metal plates laminated together.

A conventional metal laminate gasket used as a cylinder head gasket is shown in FIGS. 1 and 2. The gasket includes a plurality of cylinder bores Hc, water hole Hw (not shown), bolt holes Hb and push rod holes Hp.

In order to provide high power, an engine that the gasket 10 is installed is made as light as possible. Thus, a wall or distance between holes are made as small or thin as possible, such that the push rod holes are made close to an edge of the gasket. Also, the size of the gasket is made substantially the same as in the engine to be completely compressed by the engine parts.

As shown in FIGS. 1 and 2, the push rod hole Hp is made wide to have a length L. Since the push rod hole Hp is located close to the edge of the gasket 10, an elongated portion 11 formed between the push rod hole Hp and the edge of the gasket has a width W less than the length L of the push rod hole Hp.

When the gasket 10 thus formed is installed between a cylinder head CH and a cylinder block CB and is used, the gasket 10 receives pressure due to expansion and contraction of the cylinder block CB and the cylinder head CH. Also, the engine vibrates and pressure at the cylinder head CH changes repeatedly, so that the gasket is compressed repeatedly. As a result, the elongated portion 11 is gradually pushed outwardly as shown in dot lines in FIG. 1.

Especially, in case the gasket is formed of more than three plates, a middle plate is liable to be pushed outwardly. Namely, in case the gasket 10 is formed of an upper plate 12, a middle plate 13 and a lower plate 14, the elongated portion 11' at the middle plate 13 may project outwardly, as shown in FIG. 2. This is because the elongated portion 11' of the middle plate 13 may slide between the upper and lower plates 12, 13 by the repeated vibration of the engine.

In case the elongated portion 11 projects outwardly from the edge of the engine, the sealing at the elongated portion 11 deteriorates. Thus, oil may leak from the push rod hole Hp. If the water hole is formed near the push rod hole Hp, water may leak from the water hole.

In a manifold gasket 15 as shown in FIG. 3, an elongated portions 16 between bolt holes 17 has a width less than a length of a hole 18. Thus, the elongated portions 16 are pushed outwardly when the engine is operated, so that the elongated portions 16 are not sufficiently sealed by flanges of a manifold. Sealing at the manifold gasket may be deteriorated.

Accordingly, one object of the invention is to provide a metal laminate gasket with a deformation preventing mechanism, wherein an elongated portion near an edge of the gasket does not substantially deform when used for a long time.

Another object of the invention is to provide a metal laminate gasket as stated above, wherein sealing near an edge of a gasket is not deteriorated.

A further object of the invention is to provide a metal laminate gasket as stated above, wherein the gasket can be easily and economically manufactured.

Further objects and advantages of the invention will be apparent from the following description of the invention.

SUMMARY OF THE INVENTION

A metal laminate gasket in accordance with the present invention is installed in an internal combustion engine having a hole situated near and along an outer profile thereof. The hole has a length along the outer profile, which is greater than a distance between the hole and the outer profile.

The gasket is formed of a plurality of metal plates extending substantially throughout an entire area of the engine to constitute a metal laminate gasket. Each metal plate includes a side edge extending at least along the outer profile of the engine, a gasket hole situated near and along the side edge and corresponding to the hole of the engine, and an elongated portion located between the side edge and the gasket hole.

In the present invention, the metal plates are immovably fixed together at the elongated portions of the metal plates. Thus, the elongated portions of the gasket situated between the side edge and the gasket hole do not deform or project outwardly from the engine when the gasket is used for a long time.

Since the elongated portions of the metal plates are fixed together, the elongated portions of the gasket are strengthened as a whole. Thus, even if the engine vibrates severely, the elongated portions of the gasket do not deform or project outwardly. Accordingly, fluid in the gasket hole does not leak through the deformed elongated portions. The gasket is not damaged at all.

In case a part of the gasket is damaged, the damage is liable to spread to cause leakage from another hole near the gasket hole. However, in the present invention, the deformation of the elongated portions is substantially prevented. Thus, the gasket can be used for a long time without damage.

The elongated portions are connected together at at least one, preferably more than two, portions by spot welding or laser welding.

The elongated portions may extend along the outer profile of the engine without extending outwardly therefrom. However, the side edges of the elongated portions of the metal plates may project outwardly beyond the outer profile of the engine. In case the side edges project outwardly, the spot welding or laser welding is made at the projected portion.

DETAILED DESCRIPTION OF PREFERRED EMBODIMENTS

Figure 4:
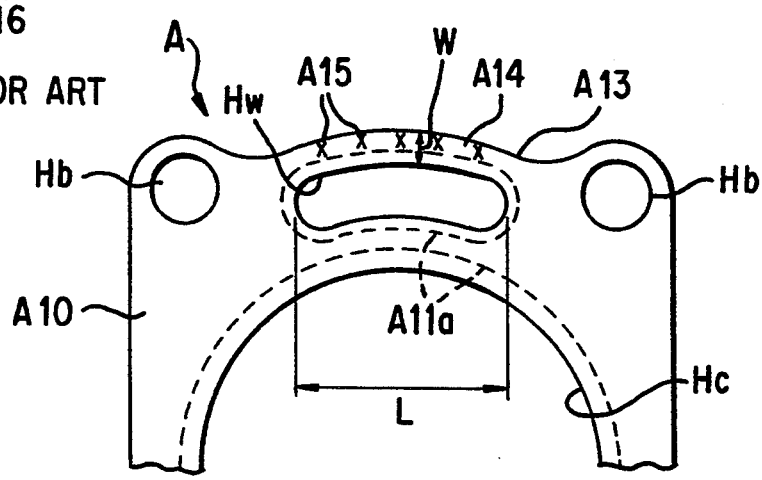
FIG. 4 is a plan view of a part of a first embodiment of a gasket of the invention.

Referring to FIG. 4, a first embodiment A of a gasket of the invention is shown. The gasket A is a cylinder head gasket and includes a plurality of cylinder bores Hc, water holes Hw, oil holes Ho (not shown) and bolt holes Hb, as in the conventional gasket.

The gasket A is formed of three plates, i.e. upper, middle and lower plates A10, A11, A12 (only A10 is shown in FIG. 4), laminated together and extending throughout an entire area of the engine. The middle plate A11 includes beads A11a around the cylinder bore Hc and the water hole Hw to seal therearound.

In the gasket A, the water hole Hw has a length L, and is located near a side edge A13 between the bolt holes Hb to form an elongated portion A14 with a distance W. The length L of the water hole Hw is greater than the distance W relative to the side edge A13. Also, the water hole Hw is located away from the bolt holes Hb.

In the gasket A, therefore, a plurality of spot weldings A15 is applied at the elongated portion A14 to connect the plates A10, A11, A12 together. The elongated portion A14 is strengthened thereat.

Thus, when the gasket A is installed between the cylinder head CH and the cylinder block CB and is used for a long period of time, the elongated portion A14 does not extend or project outwardly from the engine. The elongated portion A14 is securely retained between the cylinder head CH and the cylinder block CB. Water does not leak from the water hole Hw.

Figure 1:
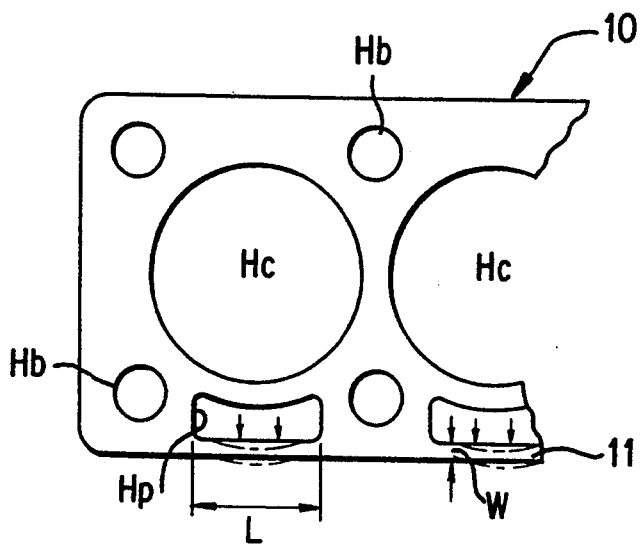
FIG. 1 is an explanatory plan view of a part of a conventional cylinder head gasket.
Figure 2:
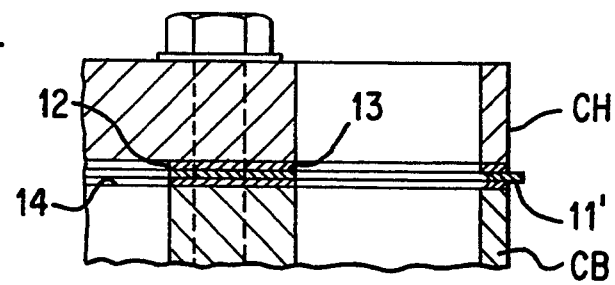
FIG. 2 is a section view of a conventional cylinder head gasket installed between a cylinder head and a cylinder block.
Figure 3:
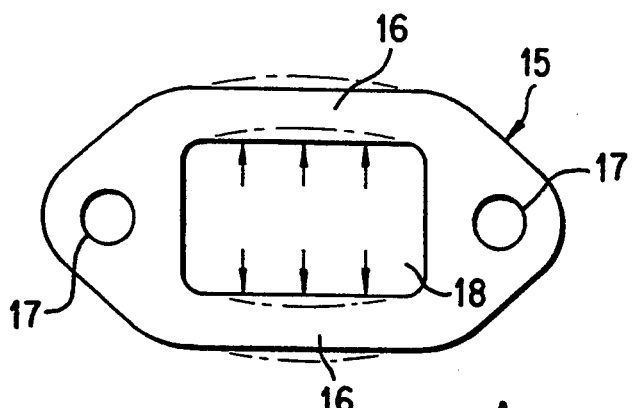
FIG. 3 is an explanatory plan view of a conventional manifold gasket.

In this respect, if the spot welding A15 is not formed at the elongated portion A14, a part of the elongated portion at the middle plate may project outwardly, as in the portion 11' shown in FIG. 2. As a result, surface pressure at the elongated portion decreases to cause leakage of water from the water hole Hw.

In the present invention, the plates for forming the elongated portion A14 are securely fixed together. Thus, the elongated portion A14 do not project outwardly and are held between the cylinder head CH and the cylinder block CB. No leakage of fluid occurs from the water hole Hw.

Figure 5:
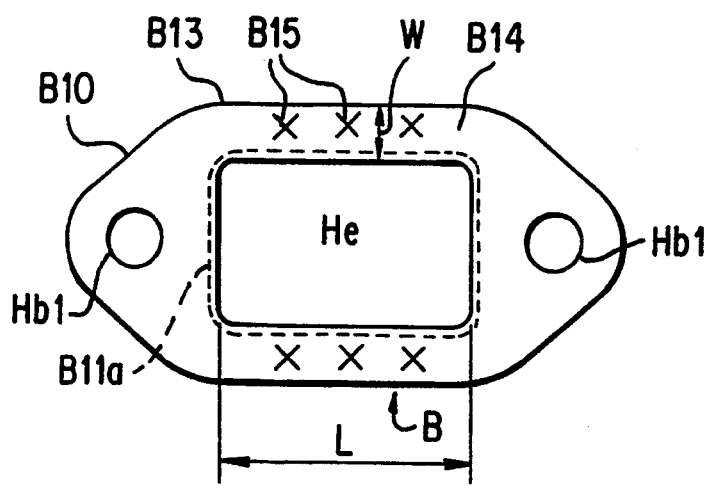
FIGS. 5 and 6 are plan views of second and third embodiments of the gasket of the invention.

FIG. 5 shows a second embodiment B of the gasket of the invention. The gasket B is a manifold gasket and includes bolt holes Hb1 and an exhaust hole He. The gasket B is formed of three plates B10, B11, B12 (B10 is only shown), wherein the plate B11 situated between the plates B10, B12 includes a bead B11a around the exhaust hole He.

The exhaust hole He has a length L between the bolt holes Hb1, and is located in the gasket B to form elongated portions B14 at side portions between the bolt holes Hb1. Each elongated portion B14 is held between outer edges B13 and the exhaust hole He.

In the gasket B, spot weldings B15 are applied to the elongated portions B14 to connect the plates B10, B11, B12 together. Since the elongated portions B14 are strengthened by connecting the plates together, the elongated portions B14 do not project outwardly even if used for a long time.

Figure 6:
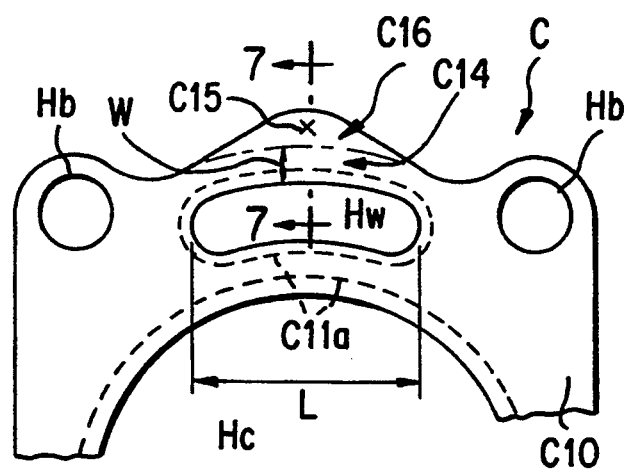
Figure 7:
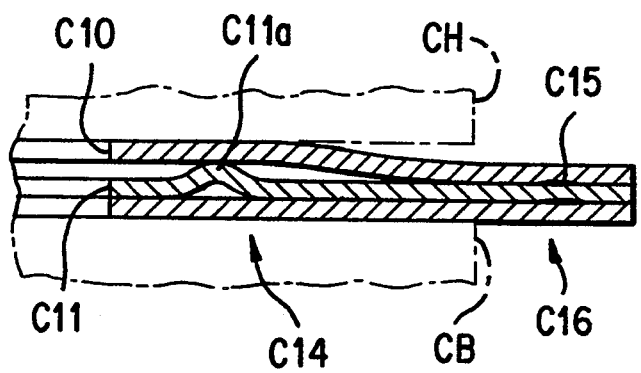
FIG. 7 is an enlarged section view taken along a line 7—7 in FIG. 6.

FIGS. 6 and 7 show a third embodiment C of a gasket of the invention. The gasket C includes a cylinder bore Hc, bolt holes Hb and a water hole Hw, and is formed of three plates C10, C11, C12 with beads C11a, similar to the gasket A. The water hole Hw has a length L and is located away from a gasket edge at a distance W.

In the gasket C, however, the gasket C is provided with an extension C16 extending outwardly from an elongated portion C14 to project sidewardly from the cylinder head CH and the cylinder block CB when installed therebetween. Spot welding C15 is applied at the extension C16 to connect the plates C10, C11, C12. In the gasket C, since the extension C16 is formed, the distance W from the water hole Hw to the gasket edge is increased. Thus, the strength of the gasket is increased. The gasket C operates as in the gasket A.

Figure 8:
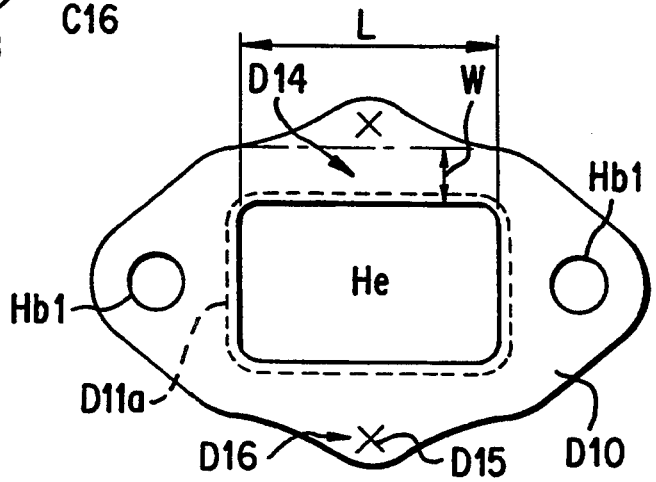
FIG. 8 is a plan view of a fourth embodiment of a gasket of the invention.

FIG. 8 shows a fourth embodiment D of a gasket of the invention. The gasket D is a manifold gasket and includes bolt holes Hb1 and an exhaust hole He. The gasket D is formed of three plates D10, D11, D12 (D10 is only shown), wherein the plate D11 situated between the plates D10, D12 includes a bead D11a around the exhaust hole He. The exhaust hole He has a length L and is located away from a gasket edge at a distance W.

In the gasket D, however, the gasket D includes extensions D16, which extend outwardly from a gasket attaching portion of the manifold when installed. Spot weldings D15 are made at the extensions D16 to connect the plates D10, D11, D12 together. In the gasket D, since the extensions D16 are formed, the distance W from the exhaust hole He to the gasket edge is increased. Thus, the strength of the gasket is increased. The gasket D operates as in the gasket B.

In the present invention, the metal plates of the gasket are connected or fixed together at the elongated portion situated between a hole and a gasket edge. Thus, the elongated portion of the gasket is strengthened and does not deform even if used for a long time. Leakage of fluid from the hole is prevented.

While the invention has been explained with reference to the specific embodiments of the invention, the explanation is illustrative, and the invention is limited only by the appended claims.

What is claimed is:

1. A metal laminate gasket for an internal combustion engine, said engine having an outer profile, at least one cylinder bore, at least two bolt holes and an additional hole situated along the outer profile between the outer profile and the cylinder bore and between the two bolt holes, said additional hole having a length extending along the outer profile so that the length of the additional hole is greater than a distance between the additional hole and the outer profile, said gasket comprising, a plurality of metal plates extending substantially throughout an entire area of the engine to constitute a metal laminate gasket, each of said metal plates including a side edge extending along the outer profile of the engine, a cylinder bore and bolt holes of the gasket corresponding to those of the engine, a gasket hole having a size corresponding to that of the additional hole and situated near and along the side edge and between the bolt holes of the gasket, and an elongated portion located between the side edge and the gasket hole and between the bolt holes of the gasket, said metal plates being immovably fixed together at the elongated portions of the metal plates to prevent the elongated portions from deforming outwardly of the engine.

2. A metal laminate gasket according to claim 1, wherein the elongated portions of the metal plates are fixed together by at least one spot weld.

3. A metal laminate gasket according to claim 2, wherein the gasket is formed of at least three plates, all the plates being fixed together by the spot weld.

4. A metal laminate gasket according to claim 2, wherein in a side edge area of the gasket, said spot weld is only formed at the elongated portion.

5. A metal laminate gasket for an internal combustion engine, said engine having an outer profile, at least one cylinder bore, at least two bolt holes and an additional hole situated along the outer profile between the outer profile and the cylinder bore and between the two bolt holes, said additional hole having a length extending along the outer profile so that the length of the additional hole is greater than a distance between the additional hole and the outer profile, said gasket comprising, a plurality of metal plates extending substantially throughout an entire area of the engine to constitute a metal laminate gasket, each of said metal plates including a cylinder bore and bolt holes of the gasket corresponding to those of the engine, a side edge extending partly along the outer profile of the engine near the bolt holes of the gasket and projecting outwardly in a direction away from the cylinder bore of the gasket beyond the outer profile of the engine at an area between the bolt holes of the gasket to form an extension, a gasket hole having a size corresponding to that of the additional hole and situated near the cylinder bore of the gasket and between the bolt holes of the gasket, and an elongated portion located between the extension and the gasket hole and between the bolt holes of the gasket, said metal plates being immovably fixed together at the extensions to prevent the elongated portions from deforming outwardly of the engine.

6. A metal laminate gasket according to claim 5, wherein the extensions of the metal plates are fixed together by at least one spot weld.

7. A metal laminate gasket according to claim 6, wherein the gasket is formed of at least three plates, all the plates being fixed together by the spot weld so that a middle plate does not move relative to the other plates.

8. A metal laminate type manifold gasket for an internal combustion engine, said engine having an outer profile, an exhaust hole having a length extending along the outer profile so that the length of the exhaust hole is greater than a distance between the exhaust hole and the outer profile, and two bolt holes at longitudinal side areas of the gasket, said gasket comprising, a plurality of metal plates to constitute a metal laminate gasket, each of said metal plates including an exhaust hole and bolt holes of the gasket corresponding to those of the engine, a side edge extending partly along the outer profile of the engine near the bolt holes of the gasket and projecting outwardly in a direction away from the exhaust hole of the gasket beyond the outer profile of the engine at an area between the bolt holes of the gasket to form an extension, and an elongated portion located between the extension and the exhaust hole of the gasket and between the bolt holes of the gasket, said metal plates being immovably fixed together at the extensions to prevent the elongated portions from deforming outwardly of the engine.

9. A metal laminate gasket according to claim 8, wherein the extensions of the metal plates are fixed together by at least one spot weld.

10. A metal laminate gasket according to claim 9, wherein the gasket is formed of at least three plates, all the plates being fixed together by the spot weld so that a middle plate does not move relative to the other plates.

* * * * *